Oct. 9, 1962 H. A. REECE 3,057,615
AIR SUPPLY SYSTEM FOR CUPOLAS
Filed Jan. 21, 1958

INVENTOR.
HERBERT A. REECE

BY

ATTORNEYS

3,057,615
AIR SUPPLY SYSTEM FOR CUPOLAS
Herbert A. Reece, 118 E. 3rd Court, Hibiscus Island, Miami Beach 39, Fla.
Filed Jan. 21, 1958, Ser. No. 710,333
8 Claims. (Cl. 266—30)

My invention relates to apparatus for supplying air to cupolas or metallurgical furnaces.

An object of my invention is to provide for equalizing the supply of air delivered through a plurality of tuyeres to the interior of the cupola.

Another object is to provide means for by-passing the excess of air delivered toward one tuyere to another tuyere having a relatively lesser amount of air supplied thereto.

Another object is the provision for substantially equalizing the pressure of air supplied to a plurality of tuyeres disposed at intervals around the circumferential wall of a cupola.

Another object is the provision for leaking the air being supplied toward one tuyere to other neighboring tuyeres in order to provide an improved balance between the air supplied through the several tuyeres to a cupola.

Another object is the provision for by-passing means between the boots extending between a common windbox around the cupola and the individual tuyeres.

Another object is the provision for means to better equalize the supply of oxygen delivered to a cupola at a plurality of equidistant intervals around the interior wall of the cupola.

Figure 1:
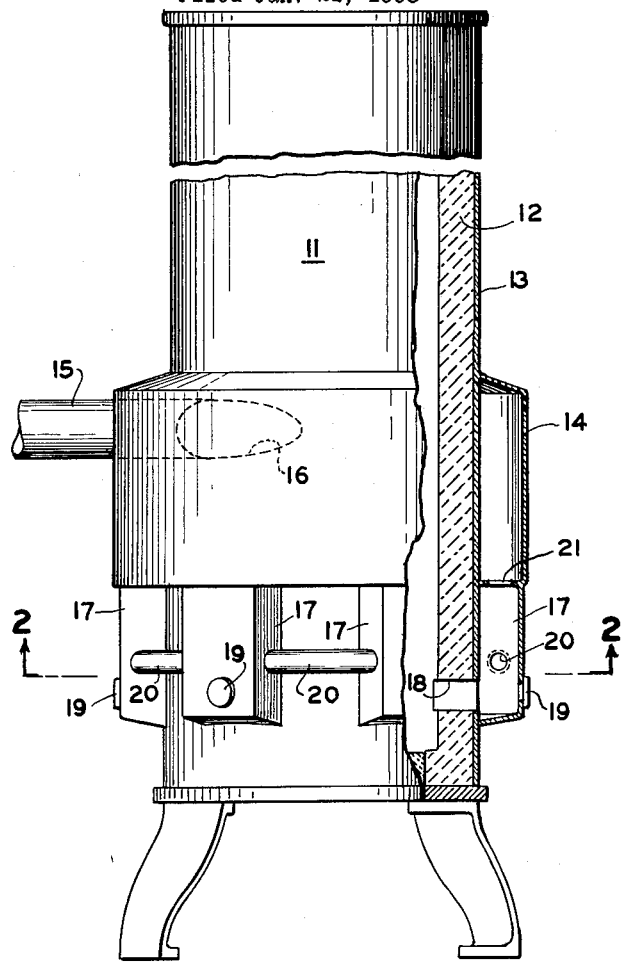
Figure 2:
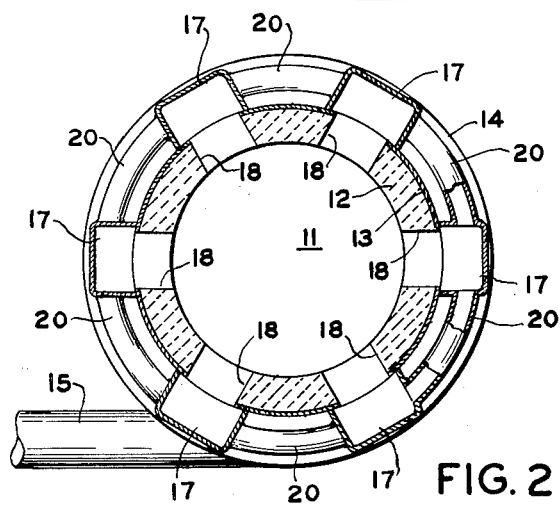

Other objects and a fuller understanding of my invention may be had by referring to the following description and claims, taken in conjunction with the accompanying drawing, in which:

FIGURE 1 is an elevational view partly in section of a cupola and air supply apparatus embodying my invention; and FIGURE 2 is a cross-sectional view looking in the direction of the arrows 2—2 of FIGURE 1.

The cupola itself, denoted generally by the reference character 11, is the usual construction and has a refractory lining 12 surrounded by a metal shell 13.

A wind box 14 of annular form is mounted around the shell of the cupola intermediate the ends of the cupola, the wind box providing a common chamber extending completely around the cupola.

An inlet pipe or conduit 15 is in communication through an opening 16 with the wind box 14. The conduit 15 is disposed somewhat tangentially to the annular wind box 14. The conduit 15 is in communication with a source of an air blast, such as an air compressor, which delivers a strong blast of air through the conduit 15 to the interior of the wind box 14. By reason of the disposition of the conduit 15 and its opening 16 relative to the wind box 14, the blast of air tends to rapidly circle around the cupola through the wind box.

The cupola 11 has six tuyeres 18, for example, extending through the shell 13 and refractory lining 12 in a radial direction. The tuyeres 18 are equidistantly spaced around the circumferential extent of the cupola. There are six boots 17 extending between the wind box 14 and each of the respective tuyeres 18. Openings 21 in the bottom of the wind box 14 provide communication from the wind box 14 to each of the six boots 17. As seen in the drawing, there is a boot 17 in alignment with each of the respective tuyeres 18. As there are six boots 17, there are also six openings 21 corresponding to each of the boots 17.

The boots 17 each extend in a vertical direction and downwardly about each tuyere 18 so that air moving downwardly in a boot 17 is delivered through a respective tuyere 18 to the interior of the cupola. In the wall of each boot 17 opposite a tuyere 18 there is a peephole device 19 for permitting inspection therethrough to the interior of the cupola through the tuyere.

Extending between each of the adjacent boots 17 at an elevation just above the tuyeres 18, there are positioned by-pass conduits 20, the ends of the conduits 20 being welded or otherwise suitably secured to the sides of the boots so that air in the boots may pass through the by-pass conduits 20 to the interior of adjacent boots. Thus all of the boots are in intercommunication through the several by-pass conduits 20 in the neighborhood of tuyeres 18 and of the locations just above the upper edge or wall of the tuyeres 18.

By reason of the circular travel of air through the wind box 14 from the tangentially disposed conduit 15, there is a tendency for some of the tuyeres through their respective boots to receive more air and at a faster rate than other tuyeres. By means of the by-pass conduits 20 providing intercommunication between the several boots 17 in the vicinity of the tuyeres 18, there is provided a better distribution of air through the plurality of tuyeres to the cupola. Upon one of the boots receiving air at a faster rate or higher pressure than other boots, the excess air can be leaked or by-passed off through the by-pass conduits 20 to adjacent boots having air supplied at a relatively lesser speed or less pressure. Inasmuch as air contains oxygen, the heating operation performed by the cupola is more uniform around the circumferential extent of the cupola within the body thereof by means of having a substantially equal supply of oxygen-containing air delivered through the several tuyeres. The arrangement thus provides for the by-passing of oxygen between different locations around the cupola so as to supply the oxygen at a substantially uniform rate through the plurality of tuyeres to the interior of the cupola. A greater efficiency in operation of the cupola is thus assured with apparatus embodying my invention.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In a furnace having a wind box disposed adjacent and around the body of the furnace at one elevation and a plurality of boots spaced apart around said furnace and extending downwardly from the said wind box to tuyeres at a lower elevation, each boot being adapted to supply air from the wind box to one of said tuyeres only, respectively, equalizing means comprising a conduit disposed externally of said wind box and interconnecting adjacent of said boots at an elevation below said wind box and above said tuyeres to vent air from a boot to an adjacent boot whereby excess air supplied to a tuyere by a boot may be readily by-passed prior to arrival at a tuyere through said conduit to adjacent tuyeres, the inner cross-sectional areas of said conduit on both opposite sides of each boot at said elevation being less than the inner cross-sectional area of each boot below said elevation and above said tuyeres to bias the flow of air downwardly in each boot toward the tuyere supplied thereby.

2. In a furnace having a wind box disposed around the furnace body and a plurality of individual boots each leading from said wind box to one only of a plurality of tuyeres respectively, supplying air to the interior of the furnace, the improvement of a conduit interconnecting said boots at a distance from said wind box and at a distance from said tuyeres to permit air to pass therethrough between said boots at points intermediate the wind box and tuyeres, the conduit providing for by-passing prior to delivery to a tuyere of air at a relatively greater pressure in a boot to boots containing air at a relatively lesser pressure, the capacities of said conduit and boots intermediate the conduit and respective tuyeres being proportioned to bias the flow of air through each boot past the conduit to the respective tuyere supplied thereby.

3. The combination of a wind box for a cupola and surrounding the same, a plurality of boots each providing communication between the wind box and an individual tuyere, respectively, of a plurality of tuyeres entering the cupola, and a plurality of conduits each providing communication between adjacent boots at a distance from the above tuyeres with which the respective boots communicate, said conduits balancing the air supply prior to delivery to the tuyeres upon a boot supplying more air from the wind box than other boots, said conduits having lesser capacity to flow of air therethrough from each said boot than the capacity of each said boot to flow of air therethrough from the location of communication with said conduits to the respective tuyeres.

4. In a cupola having a wind box for supplying air to a plurality of tuyeres entering the cupola at a plurality of spaced intervals around the cupola and at an elevation spaced from said wind box, the combination of a plurality of boots disposed around the cupola at spaced intervals and individually communicating with said wind box, each individual boot communicating with a respective one of said tuyeres only to supply air thereto from said wind box, and a plurality of conduits each extending between adjacent boots at a location spaced from the tuyeres supplied by said adjacent boots, said conduits providing for an oversupply of air through a boot to one tuyere relative to the supply of air through boots to other tuyeres being vented through said conduits to respective boots to said other tuyeres to balance the air supplied to the tuyeres from the wind box through the respective boots, said conduits being restricted to flow of air therethrough relative to the flow of air allowed through the boots from said location to the respective tuyeres to induce the flow of air directly through each boot to the tuyere in communication therewith in the absence of substantial lack of balance through the boots from the wind box.

5. Apparatus for supplying air to a plurality of tuyeres entering a metallurgical furnace at spaced intervals around the furnace, comprising the combination of a wind box positioned around the furnace at a distance from said tuyeres, a plurality of boots spaced apart around the furnace and extending from and communicating with said wind box at a plurality of spaced intervals around the extent of the wind box, each of said boots extending to and communicating with a respecttive tuyere, and conduit means positioned above said tuyere for providing communication between adjacent boots in series around the furnace and at a distance from said wind box and from said tuyere, said conduit means balancing the air supply in adjacent boots at a distance from said wind box prior to delivery to said tuyeres, said boots and conduit means being so proportioned in flow capacity as to bias the flow of air directly through the boots to the respective tuyeres, said bias being opposable by substantial lack of balance in the air supply in adjacent boots at the position of said conduit means.

6. Apparatus for supplying air to a plurality of tuyeres entering a metallurgical furnace at spaced intervals around the furnace, comprising the combination of a wind box positioned around the furnace at a distance from said tuyeres, a plurality of boots spaced apart around the furnace and extending from and communicating with said wind box at a plurality of spaced intervals around the extent of the wind box, each of said boots extending to and communicating with a respective tuyere, and conduit means disposed between the wind box and tuyeres for providing intercommunication between said boots at a distance from said wind box and at points above said tuyeres to substantially equalize at said points the air supply delivered to the tuyeres by the boots supplying air from the wind box in unequal amounts, said conduit means having a lesser flow capacity than the flow capacity of the boots from said points above said tuyeres to said tuyeres to bias the flow of air directly through each boot from said wind box to the respective tuyeres, said bias being opposable by an absence of substantial equality of air supplied from the wind box to the said boots.

7. Apparatus for supplying an air blast into a cupola through a plurality of tuyeres positioned at intervals around the cupola comprising in combination a first conduit embracing the cupola at a longitudinal distance from said tuyeres and adapted to receive and deliver around the cupola an air blast, a second and separate conduit embracing the cupola at a longitudinal distance from said first conduit and from said tuyeres and closer to said tuyeres than said first conduit, and a plurality of ducts interconnecting said conduits at spaced intervals therearound and each extending beyond said second conduit to communicate with a respective tuyere, said first conduit delivering an air blast through said ducts to said tuyeres and said second conduit providing for leakage of air blast from ducts to adjacent ducts prior to delivery to said tuyeres to balance the air blast delivered to the respective tuyeres by the said ducts, said conduits and ducts being arranged and proportioned to provide for a capacity of air flow through said first conduit substantially greater than the capacity of air flow through said second conduit and the capacity of air flow through each of said ducts, from the location of second conduit to the location of the respective tuyeres, substantially greater than the capacity of air flow through the second conduit, the ratios of capacities inducing flow of air directly through each duct from the first conduit to the respective tuyeres in the presence of substantial balance of air in said ducts.

8. Apparatus for supplying an air blast into a cupola through a plurality of tuyeres positioned around the cupola in a horizontal plane at a first elevation, comprising in combination, a first conduit encircling the cupola in a horizontal plane at a second elevation above said first elevation and spaced from said tuyeres, said first conduit being adapted to receive an air blast and to circulate the same about the cupola, a second conduit encircling the cupola in a horizontal plane at an elevation below said second elevation and above said first elevation and spaced from said first conduit, and a plurality of vertically extending ducts interconnecting said first and second conduits at spaced intervals around said cupola and extending beyond said second conduit to communicate respectively with said tuyeres, said second conduit providing that air blast conducted toward a tuyere by a duct in excess of the air blast conducted toward another tuyere by another duct may leak through said second conduit prior to its conduction through the respective duct toward said another tuyere, said conduits and ducts being arranged and proportioned to provide for a capacity of air flow through said first conduit substantially greater than the capacity of air flow through said second conduit and the capacity of air flow through each of said ducts, from the location of second conduit to the location of the respective tuyeres, substantially greater than the capacity of air flow through the second conduit, the ratios of capacities inducing flow of air directly through each duct from the first conduit to the respective tuyeres in the presence of substantial balance of air in said ducts.

References Cited in the file of this patent
UNITED STATES PATENTS

| | | |
|---|---|---|
| 638,541 | Zippler | Dec. 5, 1899 |
| 1,738,277 | Barr | Dec. 3, 1929 |
| 2,273,902 | O'Smalley et al. | Feb. 24, 1942 |